US006644107B2

(12) United States Patent
Augier

(10) Patent No.: US 6,644,107 B2
(45) Date of Patent: Nov. 11, 2003

(54) METHOD AND ASSEMBLY FOR TESTING STRESS LEVELS IN A CROSS SECTION OF A PNEUMATIC TIRE

(75) Inventor: Pierre J. Augier, Grosse Pointe, MI (US)

(73) Assignee: TRINC Tire & Rim, Incorporated, Birmingham, MI (US)

( * ) Notice: Subject to any disclaimer, the term of this patent is extended or adjusted under 35 U.S.C. 154(b) by 0 days.

(21) Appl. No.: 10/074,093

(22) Filed: Feb. 12, 2002

(65) Prior Publication Data

US 2003/0159502 A1 Aug. 28, 2003

(51) Int. Cl.[7] .............................................. G01M 17/02
(52) U.S. Cl. ...................... 73/146; 73/7; 73/8
(58) Field of Search .......................... 73/146, 841, 843, 73/92, 146.2, 146.3, 146.4, 146.5, 146.8, 862.381, 7, 8

(56) References Cited

U.S. PATENT DOCUMENTS

| 2,251,803 A | 8/1941 | Pummill |
| 3,861,208 A | 1/1975 | Lippmann et al. |
| 3,934,452 A | 1/1976 | Prevorsek et al. |
| 5,467,647 A | 11/1995 | Schepp |
| 5,616,839 A | 4/1997 | Chen et al. |
| 5,773,717 A | 6/1998 | Reinhardt et al. |
| 6,430,993 B1 * | 8/2002 | Seta ............................. 73/146 |

* cited by examiner

Primary Examiner—Edward Lefkowitz
Assistant Examiner—Alandra Ellington
(74) Attorney, Agent, or Firm—Clark Hill PLC

(57) ABSTRACT

A testing assembly calculates stress levels along a cross section of a pneumatic tire. The cross section of the pneumatic tire includes its tire beads, sidewalls, and tread. The testing assembly includes a base and a plurality of mounts slidably secured to the base. Mounts secure each of the tire beads. The testing assembly also includes a platform that extends parallel across the testing assembly. The platform moves with respect to the base to simulate a tire under load. The platform does this by deforming the cross section of the tire as if it were under a load on a road. The method for using the testing assembly includes taking measurements of the cross section of the tire in an un-deflected state and a deflected state. Calculations between the two states identifies areas in the tire that stresses are damaging.

12 Claims, 2 Drawing Sheets

METHOD AND ASSEMBLY FOR TESTING STRESS LEVELS IN A CROSS SECTION OF A PNEUMATIC TIRE

BACKGROUND ART

1. Field of the Invention

The invention relates to tires of a motor vehicle. More specifically, the invention relates to testing stress levels along a periphery of a vehicular tire.

2. Description of the Related Art

Tires for a motor vehicle serve an essential part of the safety of the motor vehicle. In particular, the tires are responsible for ensuring the motor vehicle handles properly. Not only do the tires have an integral part in the proper handling, i.e., proper acceleration, deceleration and cornering, they also affect the ride and fuel consumption of the motor vehicle. Therefore, the tire provides the operator of a motor vehicle with a comfortable and fuel efficient motor vehicle.

Testing of the tire is important when determining the various properties of the tire. A tire undergoes a deformation during each rotation. Any abnormal deformation of the tire causes excessive stresses to occur and may lead to premature failure. The higher stresses and abnormal deformation lead to higher thermal generation. The key design characteristics for preventing the abnormal deformations are that of the carcass line and the mold contour. The carcass line is defined by the carcass, an element of the tire. The carcass extends between and is connected to the tire beads. The carcass extends through a tread portion of the tire substantially close to the inner surface of the tire. The mold contour includes the outer surface defined by the two sidewalls and the tread of the tire.

These two design characteristics are important in minimizing the abnormal deformations and, thus, high stresses and excess thermal energy generated by the tire under deformation. It would be beneficial to have a relatively simple test that can be utilized to evaluate the stresses of a tire when it is deformed. Such a test would allow a designer of a tire the ability to modify a mold contour with respect to a carcass extending through a carcass line to minimize stresses and enhance the performance and reliability of the tire.

U.S. Pat. No. 2,251,803, issued to Pummill on Aug. 5, 1941, discloses a tire tester. The tire tester tests a tire casing for structural defects while in place on a vehicle wheel mounted to a vehicle. The testing device includes a roller which is recessed within a pit for placement of a vehicle tire thereon. The roller is connected to a motor for variably controlling the velocity of the tire. The testing device further includes contact mechanisms, such as bellows, interconnected to a pressure gauge by a tube. The bellows are placed on either side of the tire in contact with the tread of the tire. When the testing device is activated, the tire begins rotating. The tire tester is a dynamic testing system. The bellows follow the contours of the tire and indicate any structural defects in the tire up on the pressure gauge.

The above-cited reference discloses a testing apparatus that relates only to bias tires. Radial tires were yet to be invented when the patent application was filed, 1937. The contour of the bias tire carcass and carcass line the column bigger when its inflation pressure becomes higher. Conversely, a radial tire, properly designed, does not sustain any significant change when inflated at various pressures. The invariance of the length of the radial carcass line in the presence of very stiff steel belts under the tread justify the fact that a simple one-inch radial tire section can adequately represent the tire contour in-service. This is not the case for a bias tire. Therefore, the testing apparatus of the Pummill '803 reference is required for a bias tire because the full casing must be inflated under pressure before it can be properly evaluated.

SUMMARY OF THE INVENTION

A testing assembly calculates stress levels along a cross section of a pneumatic tire having tire beads, sidewalls, and the tread. The testing assembly includes a base defining a base surface. A plurality of mounts are slidably secured to the base surface. Each of the tire beads are secured to each of the plurality of mounts. The tire beads are mounted thereto in a manner to simulate the mounting of a tire to a rim of a wheel. The testing assembly also includes a platform that extends parallel to the base surface. The platform is engagable with the tread of the tire and is movable with respect to the base. The movement of the platform simulates the tire under a load by deforming the tire.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
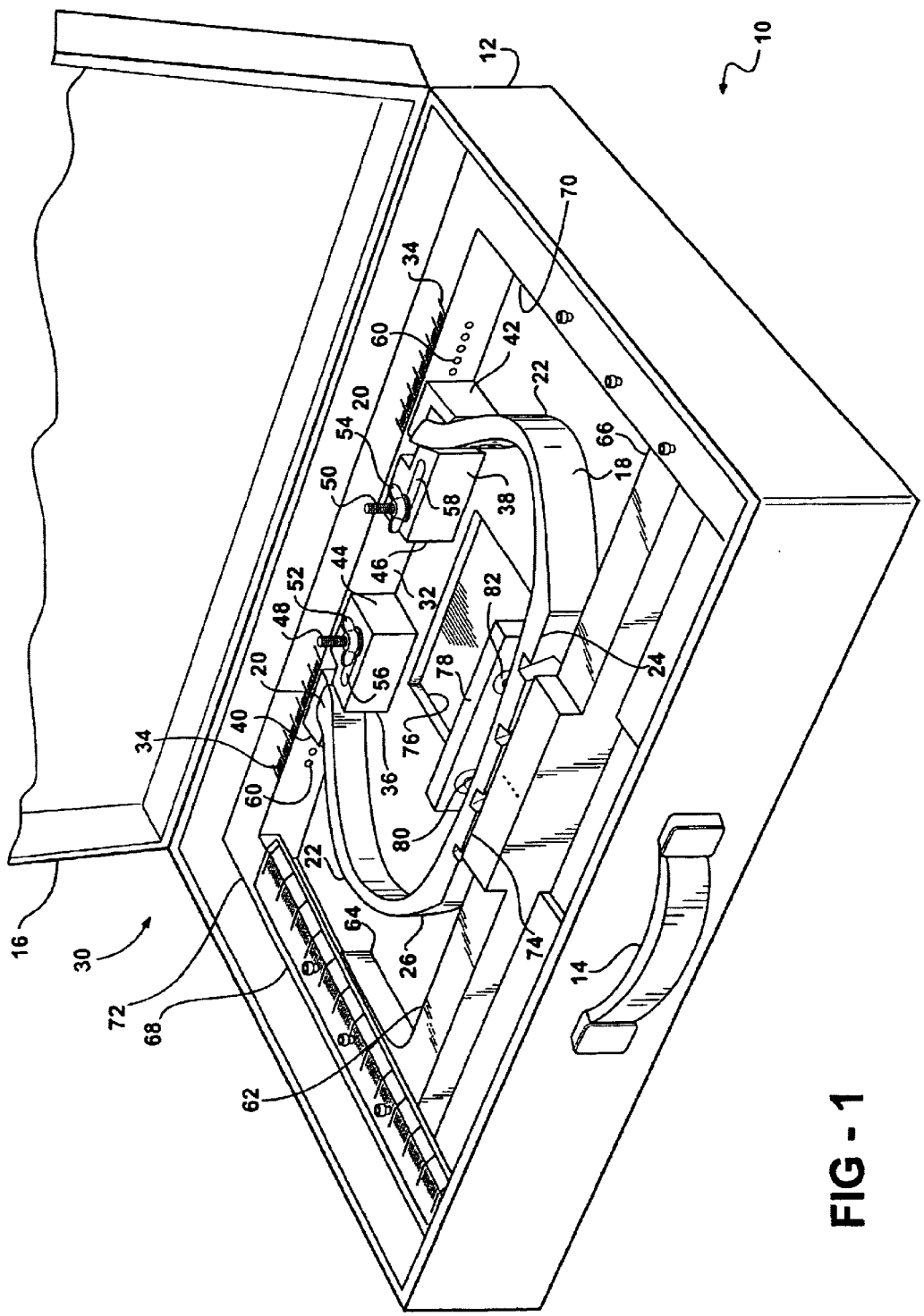
FIG. 1 is a perspective view, partially cut away, of one embodiment of a testing assembly according to the invention.

Referring to FIG. 1, one embodiment of a testing assembly according to the invention is generally indicated at 10. As shown in FIG. 1, the testing assembly 10 is framed within an attaché case 12. The attaché case 12 includes a handle 14 and a lid 16. The testing assembly 10 is designed to be easily transported. It should, however, be known to those skilled in the art that the testing assembly 10 may have many different sizes, limiting its portability. Further, while it is sure that the testing assembly 10 measures through mechanical means, it should also be apparent to those skilled in the art that electronic measuring devices may be incorporated into the invention 10 without adding to the inventive concept disclosed herein.

The testing assembly 10 does not require an entire tire for the testing thereof. The testing assembly 10 only requires a cross section 18 of a tire. In the embodiment shown in FIG. 1, the tire cross section 18 is approximately one inch thick. A simple one inch cross section 18 is adequate to test the entire tire due to the construction of the tire. More specifically, the radial configuration of today's tires allows a cross section thereof to accurately depict how the entire tire is going to react to different stress levels.

Figure 2:
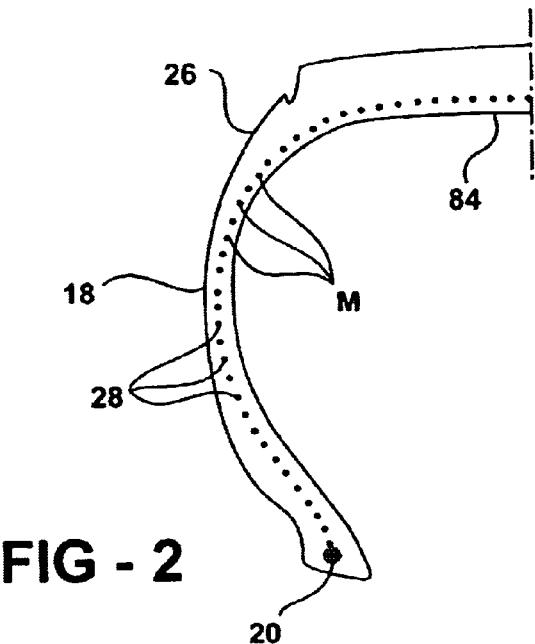
FIG. 2 is a cross-sectional side view, partially cut away, of a tire identifying a carcass line.

The cross section 18 of the tire includes two tire beads 20, two sidewalls 22 and tread 24. (A tire bead 20 is best seen in FIG. 2.) The outer periphery of the tire cross section 18 is referred to as the mold contour 26. The cross section also includes a carcass, best seen via a representation of a carcass line 28 in FIG. 2. The cross section 18 includes all of the parts of the tire and, therefore, accurately represents the complete tire.

The testing assembly 10 includes a base 30. The base 30 defines a base surface 32. The base includes gradations 34 allowing the testing assembly 10 to accurately reflect a particular configuration of a rim for the wheel to which the tire is designed to the mounted.

The testing assembly also includes a plurality of mounts 36, 38. Each of the mounts 36, 38 include rim simulating portions 40, 42 and air pressure simulating portions 44, 46. The rim simulating portions 40, 42 of the mounts 36, 38 are designed to simulate a rim to which the tire would be mounted. Likewise, the air pressure simulating portions 44, 46 of the mounts 36, 38 simulate the pressure that would be applied to a tire to force the tire beads 20 into a rim of a wheel. The force is created by the mounts 36, 38 to retain the tire beads 20 therein. Each of the mounts 36, 38 are slidable along the base 30 and may be measured out along the gradations 34. While any type of securing device may be used, the embodiment shown in FIG. 1 shows the bolt 48, 50 and wing nut 52, 54 combination. The air pressure simulating portions 44, 46 includes slots 56, 58 allowing the air pressure simulating portions 44, 46 to move with respect to the bolt 48, 50. The rim simulation portions 40, 42 are movable along the base 30 using pegs (not shown) which are insertable into a plurality of holes 60.

The testing assembly 10 also includes a platform 62. The platform 62 extends between first and second ends 64, 66. The first and second ends 64, 66 are housed within side portions 68, 70 of a frame 72 that is fixedly secured to the base 30. The platform 62 includes a tread engagement portion 74 that is generally equidistant from the first and second ends 64, 66. The tread engagement portion 74 has a width that is greater than the width of the rest of the platform 62. The tread engagement portion 74 extends into a channel 76. The channel 76 is a guide for the platform 62 as it is moved. The movement of the platform 62 is limited to one direction wherein the platform 62 remains parallel to the base 30 at all times.

The platform 62 includes a support plate 78 secured thereto. The support plate 78 includes bolts 80, 82. The support plate 78 is fixedly secured to the platform 62 via a platform extension (not shown). The platform extension extends between the platform 62 and the support plate 78. The platform extension slides within the channel 76. The support plate 78 holds the bolts 80, 82 in place allowing the bolts 80, 82 to force the tread 24 into abutment with the platform 62. The support plate 78 ensures the tread 24 remains in abutment with the platform 62 to simulate the tread 24 engaging a driving surface out which the tire would be rotating therealong.

The testing assembly 10 operates by securing the cross section 18 of the tire into the mounts 36. The tread 24 of the cross section 18 is secured to the platform 62. The platform 62 is slid within the frame 72 which, in turn, deforms the cross section 18. The deformation of the cross section 18 represents the tire to which the cross section 18 was taken as it transitions from an un-deflected state to a deflected state. As the cross section 18 becomes more deflected, it represents the tire as the tire is losing air pressure.

By viewing the cross section 18 as it moves through various degrees of deflection, measurements of the cross section 18 may be made. From the measurements of the mold contour 26 and the carcass line 28, determinations may be made as to where the tire will fail due to the high stress levels the tire will generate during normal operation under normal load.

Figure 3:
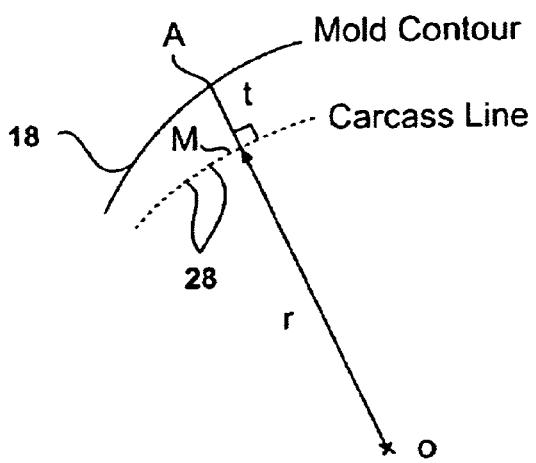
FIG. 3 is a schematic representation of factors measured to calculate stress levels according to one embodiment of the inventive method.
Figure 4:
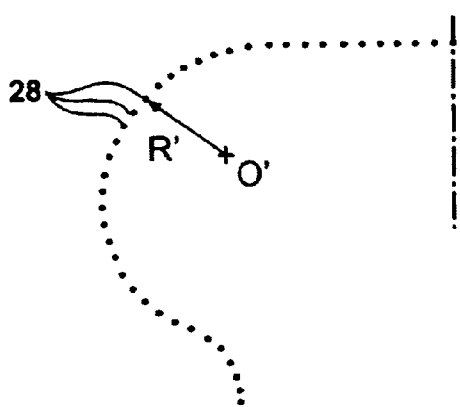
FIG. 4 is a schematic representation, partially cut away, of a deflected carcass line, used in the inventive method to calculate stress levels.

Referring to FIGS. 2 through 4, the cross section 18 is shown schematically. Further, the carcass 28 defines a carcass line (also 28) as represented by a series of points, M, extending along the carcass line 28. When the testing assembly 10 is used, a plot of the curves representing the carcass line 28 and the mold contour 26 are made. FIG. 2 represents such a plot. (Inner surface 84 of the cross section 18 is shown in FIG. 2 for purposes of orientation. The surface 84 does not have to be plotted.)

The plot set forth above is used as a tire configuration identifying a first condition. This first condition is the condition of the tire being un-deflected. At this point, parameters of the tire in the first condition are measured. Referring to FIG. 3, the measurements taken include the radius of curvature, r, of various points along the carcass line 28 and the distance, t, between the carcass line 28 and the mold contour 26.

The cross section 18 of the tire is then reconfigured to a second condition. The second condition represents the tire in a deflected state. Referring to FIG. 4, the carcass line 28 is shown in such a deflected state. Again, measurements are taken of the carcass line 28 and the mold contour 26 and the relationship therebetween, as was done prior. The relationship between the radius of curvature of the carcass line and various points in its un-deflected and deflected states identifies the stress levels of the tire with respect to specific points on the carcass line 28. Graphically, a stress map (not shown) may be generated to better articulate the relative stresses along the cross section 18. The radius of curvature r for each point M of the carcass line 28 is defined by the line OM. The tire thickness t is measured along a perpendicular at each point M on the carcass line 28. Therefore, the thickness t is defined by MA for each point M. Then, upon deflection of the cross section 18, the radius of curvature becomes r', as is represented in FIG. 4. Even through deflection, all other parameters remain equal. From these measurements, the relative stress levels for a particular location along the tire cross section 18 may be calculated using the equation set forth below:

$$S = Bt\left(\frac{1}{r'} - \frac{1}{r}\right)$$

wherein B is the bending moment at each of the points M along the carcass line 28. In practical terms, bending moments at the various points M are not significantly different. Therefore, with a satisfactory approximation, a common value of 1 can be assigned to the bending moments and the above equation becomes:

$$S = t\left(\frac{1}{r'} - \frac{1}{r}\right).$$

As the level of stress grows for a particular location along the carcass line 28 with respect to neighboring locations of the carcass line 28, failure points in the tire can be identified. Once the failure points are identified, the mold contour 26 may be modified with respect to the carcass line 28 to reduce the relative stress level of that particular location to a level similar to that of its neighboring locations. The carcass 28 should not be modified if the carcass 28 defines a carcass line that follows the Purdy theory, which was first articulated in 1928.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A testing assembly for calculating stress levels along a cross section of a pneumatic tire having tire beads, sidewalls and a tread, said testing assembly comprising:

a base defining a base surface;

a plurality of mounts slidably secured to said base surface, each of said plurality of mounts securing each of the tire beads thereto in a manner to simulate mounting of a tire to a rim of a wheel;

a platform extending parallel to said base surface, said platform engagable with tread of the cross section of the pneumatic tire and slidable toward said base to compress and deform the cross section of the pneumatic tire to simulate a pneumatic tire under load.

2. A testing assembly as set forth in claim 1 wherein each of said plurality of mounts includes a clasp for engaging each of the tire beads of the cross section of the tire.

3. A testing assembly as set forth in claim 2 wherein said platform extends between first and second ends.

4. A testing assembly as set forth in claim 3 including a frame that is fixedly secured to said base and engagable with said first and second ends of said platform.

5. A testing assembly as set forth in claim 4 wherein said frame includes a series of markings to measure gradations in the tire as it is deformed.

6. A testing assembly as set forth in claim 5 wherein said platform includes a fixture for securing the tread of the tire thereto.

7. A testing assembly as set forth in claim 6 wherein said base includes a guide for receiving said platform therein.

8. A testing assembly as set form in claim 1 including a support plate slidably engaged with said platform, said support plate slidably engagable with the tread opposite said platform to secure the tread in abutting relation with said platform.

9. A method for testing stress levels in a cross section of a tire having tire beads, sidewalls, and mold contour and a carcass defining a carcass line, the method comprising the steps of:

securing the tire beads in a predetermined position;

configuring the cross section of the tire to a first condition;

identifying the carcass line of the cross section of the tire in the first condition;

measuring parameters of the carcass line to create a first measurement;

reconfiguring the cross section of the tire to a second condition;

identifying the carcass line of the cross section of the tire in the second condition;

measuring parameters of the carcass line when the cross section of the tire is in the second condition to create a second measurement; and calculating the stress levels of the cross section of the tire based on the first and second measurements.

10. A method set forth in claim 9 including the step of calculating a radius of curvature for a plurality of points along the carcass line of the cross section of the tire in both the first and second conditions.

11. A method as set forth in claim 10 including the step of measuring the distance between the carcass line and the mold contour.

12. The method as set forth in claim 11 wherein the step of calculating the stress levels includes identifying the perpendicular between the plurality of points along the carcass line and the mold contour of the cross section of the tire.

* * * * *